United States Patent [19]

Jain et al.

[11] Patent Number: 5,204,075
[45] Date of Patent: Apr. 20, 1993

[54] PROCESS FOR THE PURIFICATION OF THE INERT GASES

[75] Inventors: Ravi Jain, Piscataway; Satish S. Tamhankar, Scotch Plains; Alberto I. LaCava, South Plainfield, all of N.J.

[73] Assignee: The BOC Group, Inc., New Providence, N.J.

[21] Appl. No.: 710,190

[22] Filed: May 30, 1991

[51] Int. Cl.$^5$ .............................................. C01B 13/00
[52] U.S. Cl. .................................... 423/219; 423/262
[58] Field of Search ................................ 423/219, 262

[56] References Cited

U.S. PATENT DOCUMENTS

| | | | |
|---|---|---|---|
| 1,658,631 | 2/1928 | Dannenbaum | 423/219 |
| 2,351,167 | 6/1944 | Ware | 423/219 |
| 3,535,074 | 10/1966 | Nakashima et al. | 423/262 |
| 3,969,481 | 7/1976 | Murray et al. | 423/219 |
| 4,055,625 | 10/1977 | Faugeras et al. | 423/262 |
| 4,579,723 | 4/1986 | Weltmer et al. | 423/219 |
| 4,713,224 | 12/1987 | Tamhanker et al. | 423/219 |
| 4,816,237 | 3/1989 | Tomomura et al. | 423/210 |
| 4,960,579 | 10/1990 | Campbell | 423/351 |
| 4,983,194 | 1/1991 | Hopkins et al. | 62/22 |
| 5,100,446 | 3/1992 | Wisz | 62/22 |

Primary Examiner—Gary P. Straub
Assistant Examiner—Timothy C. Vanoy
Attorney, Agent, or Firm—Coleman R. Reap; Larry R. Cassett

[57] ABSTRACT

A process for producing a substantially oxygen-free gaseous product such as argon containing not more than one ppm by volume of oxygen is disclosed. The process comprises introducing hydrogen into a gas stream which contains oxygen and moisture, contacting the gas stream with a dessicant to remove substantially all of the moisture therefrom, contacting the substantially anhydrous gas stream with an oxidation catalyst to convert substantially all of the oxygen in the gas stream to water, and contacting the resultant gas stream with a dessicant to remove the water created in the oxidation step. The product stream may be further purified to remove residual hydrogen contained therein.

18 Claims, 3 Drawing Sheets

PROCESS FOR THE PURIFICATION OF THE INERT GASES

DESCRIPTION OF THE RELATED ART

Commonly assigned application Ser. No. 07/467,673, filed Jan. 19, 1990 discloses the use of a three bed system for removing carbon monoxide, hydrogen, carbon dioxide and water from a gas stream, the system comprising a first adsorption bed, a catalytic oxidation bed and a second adsorption bed.

BACKGROUND OF THE INVENTION

Field of the Invention

This invention relates to a method and apparatus for purifying oxygen-containing gas streams. More particularly the invention pertains to a process for producing substantially oxygen-free inert gas streams, such as oxygen-free argon, nitrogen, helium and neon.

Inert gases, such as argon, nitrogen, and the like are widely used in industrial processes such as shielded arc welding, semiconductor manufacture, metal refining, electric light bulb manufacture and inert gas-blanketed chemical processes. In many industrial processes the presence of oxygen as an impurity in the inert gas frequently brings about undesirable results, such as the formation of oxides of materials treated in the process. Accordingly, it is frequently necessary that the inert gases used in these processes be substantially free of oxygen.

Crude inert gases that are separated from air by cryogenic or non-cryogenic means, such as argon and nitrogen, ordinarily contain up to several percent by volume of oxygen. For example, argon manufactured from air by cryogenic distillation usually contains up to 3% oxygen. This happens because it is very difficult to completely separate argon and oxygen by cryogenic distillation, since argon and oxygen have very close boiling points. When it is desired to produce substantially oxygen-free argon from oxygen-containing sources such as air, it is generally necessary to resort to purification processes other than cryogenic distillation. Methods for manufacturing high purity oxygen-free argon and other high purity inert gases include adsorption by means of molecular sieves, and catalytic deoxygenation (oxygen-removal) processes, such as the catalytic oxidation of oxygen- and hydrogen-containing streams and chemisorption of the oxygen by getter materials. Catalytic processes are generally preferred over adsorption because they provide superior results and have low operating costs.

A preferred catalytic process for the removal of oxygen from gas streams involves adding hydrogen to the gas stream and subsequently contacting the gas stream with an oxidation catalyst, for example, a noble metal catalyst, such as platinum or palladium. The catalyst converts the oxygen and hydrogen into water, which can be subsequently removed. Such a process is disclosed in U.S. Pat. No. 4,960,579, which teaches the production of high purity nitrogen from air by first separating nitrogen from air by membrane separation or pressure swing adsorption and then removing residual oxygen from the nitrogen product by introducing purified hydrogen into the gas stream and contacting the stream with an oxidation catalyst such as a noble metal or combination of noble metals to cause the oxygen and hydrogen in the stream to combine to form water. Other patents which disclose contacting oxygen- and hydrogen-containing gas streams with a deoxygenation catalyst are U.S. Pat. Nos. 3,535,074, 4,579,723 and 4,713,224.

This above-described catalytic deoxygenation process performs satisfactorily with fresh catalyst; however the concentration of oxygen impurity in the product gas can increase over extended periods of time. It appears that the catalyst gradually deteriorates upon continued usage. It has been theorized that the deterioration of the catalyst is caused by the presence of catalyst poisons that are present in the gas stream being treated. These impurities may come from various sources. One likely source of impurities is the gas stream entering the system for purification. This stream may contain trace amounts of gaseous impurities, such as sulfur compounds. Another possible source of impurities is the water that is used to cool the feed gas compressor commonly used in conjunction with the process. The cooling water may contain elements or compounds, such as chlorine or compounds of chlorine, phosphorus and molybdenum that were initially present in the water or that were added in water treatment operations. The above impurities are known catalyst poisons. Even though they are present in the gas stream in very small concentrations, long term exposure of the deoxygenation catalyst to them will slowly cause the catalyst to become poisoned. In addition to catalyst poisons, moisture present in the gas stream may cause a reduction of the oxidation activity of the catalyst.

Process improvements which eliminate or reduce the adverse impact of poisons on the effectiveness of deoxygenation catalysts used in the production of oxygen-free inert gases are constantly sought. The present invention provides such an improvement.

SUMMARY OF THE INVENTION

The present invention is generally directed to a process for producing a substantially oxygen-free gaseous product from a feed stream containing oxygen. The process comprises adding hydrogen to the feed stream, unless the feed stream initially contains sufficient hydrogen to remove substantially all of the oxygen from the gas stream by the formation of water; removing from the feed stream substances that are detrimental to the oxidation catalyst used in the invention, such as water in vapor or droplet form and catalyst poisons dissolved or dispersed in the water droplets; contacting the moisture-free feed stream with an oxidation catalyst to combine substantially all of the oxygen present in the feed stream with hydrogen to form water vapor; and removing water vapor produced in the deoxygenation step from the stream. The resulting gaseous product is substantially free of oxygen and water vapor, i.e. it generally contains not more than about one ppm by volume of each of these impurities.

According to the invention, the gaseous feed is treated in three serially connected zones: a first adsorption zone, a catalysis zone and a second adsorption zone. The first and second adsorption zones contain one or more beds of an adsorbent for moisture and other gaseous impurities that are harmful to the oxidation catalyst. The adsorbents may be any substances that adsorb water and the above-described gaseous impurities. Preferred adsorbents include activated alumina, silica gel, zeolites and combination thereof. The catalysis zone contains one or more catalysts that catalyze the conversion of oxygen and hydrogen to water. Any catalyst that will effect the desire reaction may be used. Preferred oxidation catalysts are supported palladium and supported mixtures of palladium and platinum.

The relative thicknesses of the adsorption and catalyst beds may be varied to suit the conditions encountered in the process. In some cases, such as when the feed gas contains small concentrations of oxygen and relatively large concentrations of moisture or other gaseous impurities, it may be preferable that the first adsorption bed be large relative to the second adsorption bed, because small amounts of water will be generated in the catalysis zone when the feed gas contains very little oxygen. On the other hand, when the feed gas contains considerable quantities of oxygen and very little moisture and other impurities, it may be preferable that the first adsorbent bed be small and the catalyst bed and the second adsorption bed be larger. The dimensions of the various beds used in the process of the invention is a matter of choice.

The process can be conducted either batchwise or continuously. In either case, the treatment region containing the two adsorption zones and the catalysis zone is periodically regenerated by purging and hence removing the accumulated adsorbed impurities. In a batchwise system, purification of the feed gas must be stopped during regeneration of the treatment section. In the continuous system, which is the preferred embodiment, a plurality of treatment regions are used, with at least one treatment region producing purified gas while at least one other treatment region is undergoing regeneration. Regeneration of the treatment regions may be carried out by purging with a suitable gas at near feed temperatures in a pressure swing mode or at elevated temperatures in a temperature-swing mode.

After the product gas leaves the treatment region unreacted hydrogen can be removed from the product gas by a separation treatment, such as cryogenic distillation. When the feed gas is an argon stream that contains small amounts of nitrogen, which is generally the case with crude argon produced by cryogenic air separation, the residual nitrogen can also be removed by the cryogenic distillation used for hydrogen removal subsequent to treatment by the process of the invention.

In a preferred embodiment the feed gas is purified in a single vessel containing three contiguous sections: a first moisture adsorption section, a catalysis section and a second moisture adsorption section. In still another preferred embodiment the feed gas consists substantially of one or more inert gases and contains not more than about 500 volume parts per million (vpm) oxygen. The most preferred feed gases are crude argon or crude nitrogen The process of the invention provides a number of advantages over prior art processes. Passing the feed gas through an adsorbent bed prior to contacting it with the deoxygenation catalyst removes substances from the gas that tend to adversely affect the catalyst, thereby prolonging the life of the catalyst. Purging the adsorption and catalysis sections with a gas that is substantially free of oxygen and moisture regenerates the beds and enables the catalyst to continue to perform at high efficiency. When the feed gas contains no more than about 500 vpm oxygen, as in a preferred embodiment, the process can be operated at a low temperature, thereby minimizing the chance of inadvertently desorbing the adsorbent beds. Practicing the process of the invention in a single vessel having contiguous beds provides the advantages of simplicity of operation and reduced capital costs.

BRIEF DESCRIPTION OF THE DRAWINGS

The attached drawings, in which like reference characters are used in the various figures to designate like parts, are exemplary of various embodiments of the invention.

DETAILED DESCRIPTION OF THE INVENTION

The process of the invention is useful for the removal of oxygen and water from any gas stream, but is particularly suitable for particularly suitable for the removal of small amounts of oxygen from inert gas streams, such as those comprised substantially of argon and/or nitrogen. The process is efficient for removing up to about 3 volume percent (30,000 vppm) of oxygen from the gas stream and is especially advantageous for purifying gas streams that contain not more than about 500 vppm of oxygen, because these streams can be efficiently purified in single vessel purification system without increasing the temperature in the adsorption beds to the extent that moisture trapped in these beds is inadvertently desorbed.

Figure 1:
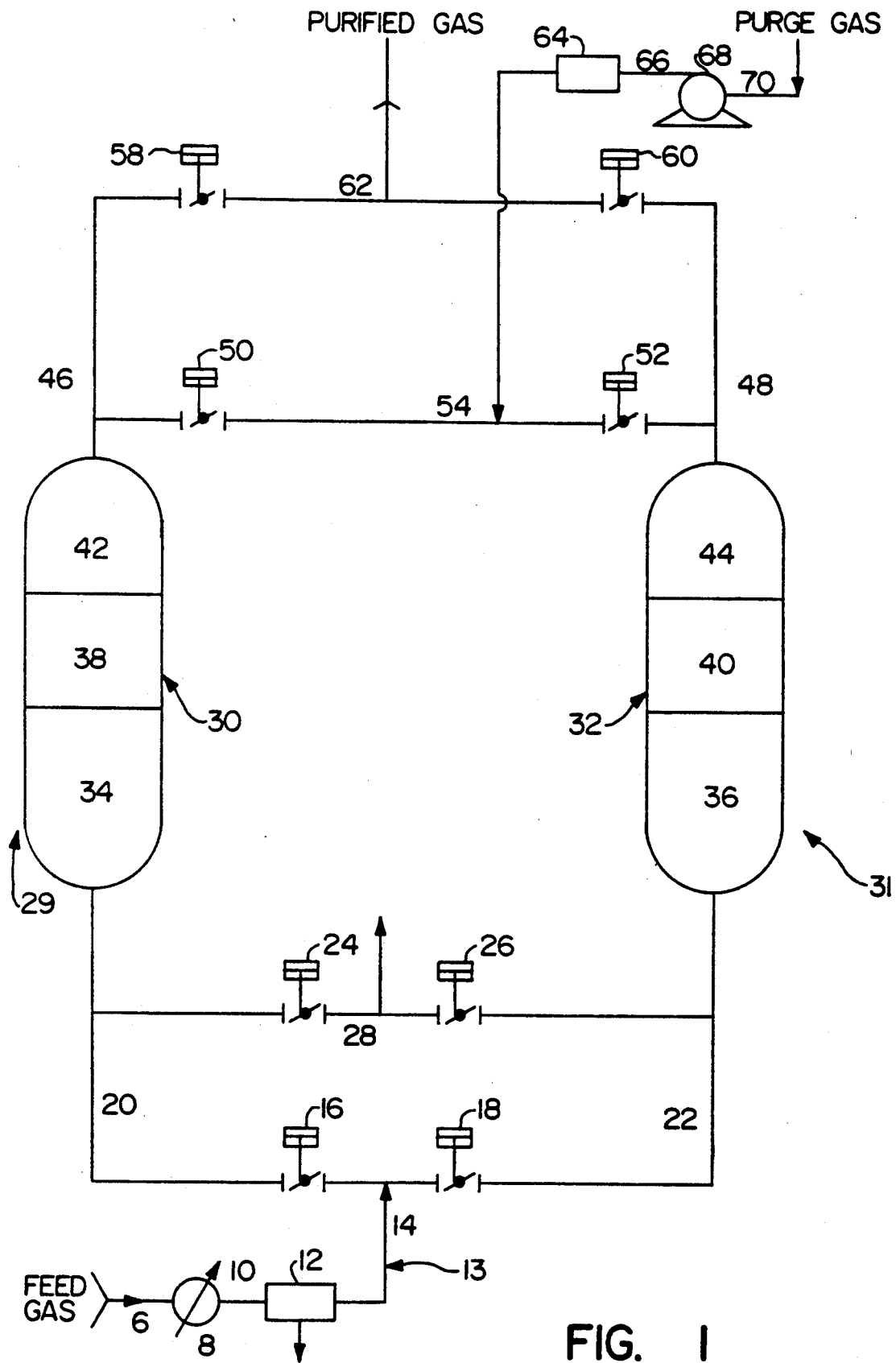
FIG. 1 is a schematic view of one embodiment of the invention, showing a continuous process for the production of highly purified gas utilizing either a pressure-swing or a temperature-swing mode of operation.

Referring to the drawings, and particularly to FIG. 1, there is shown a continuous process for the production of purified gas in which the treatment zone undergoing regeneration is purged with a gas either at elevated temperatures (temperature-swing mode of operation), or at a temperature close to the incoming feed gas temperature (pressure-swing mode of operation).

In the temperature-swing mode of operation, a feed gas stream at a pressure of 50 to 150 psig enters the system through line 6. The feed gas may be any gas from which small amounts of oxygen and up to saturation amounts of water are to be removed, but is preferably an inert gas such as argon, nitrogen, helium, neon or mixtures of these. The feed gas may contain hydrogen in addition to the oxygen and water impurites. The feed gas stream in line 6 may be sent to heat exchanger 8 (optional) wherein it can be cooled and introduced via line 10 into water separator 12 (also optional) to remove water therefrom. The gaseous feed entering the treatment zone through line 14 is generally at a temperature of from about 5° C. to about 70° C., and preferably at a temperature of from about 10° C. to about 50° C. Heat exchanger 8 and water separator 12 are preferably used when the incoming gas stream contains significant quantities of water vapor. Removing some of the moisture from the feed stream in separator 12 lightens the burden on the first adsorption zone.

If the feed gas does not contain sufficient hydrogen to consume all of the oxygen contained in the gas stream by combination therewith to form water, additional hydrogen can be injected into the feed gas stream through line 13. The amount of hydrogen injected into the gas stream depends upon the amount of oxygen and hydrogen present in the stream. The amount of hydrogen added is such that the total amount of hydrogen in the gas stream will be at least the stoichiometric quantity required for the conversion of substantially all of the oxygen present in the feed stream to water. Preferably, a stoichiometric excess of hydrogen is added to ensure that all of the oxygen present in the stream is consumed.

The hydrogen-containing feed gas stream next enters treatment zone 29 or treatment zone 31. The specific zone which the feed gas enters depends on which phase of the operating cycle the system is in. The description of the operation of the system will begin with the system in the phase in which treatment zone 29 is in the gas purification mode and treatment zone 31 is in the regeneration mode.

For the temperature-swing embodiment shown in FIG. 1, with vessel 30 in the purification mode and vessel 32 in the regeneration mode, vessel 30 is normally pressurized slowly with feed gas prior to the start of the purification process. Valve 16 is open for the pressurization of vessel 30. After pressurization of vessel 30, pressurized feed gas is admitted to treatment zone 29, comprising vessel 30, through line 14, valve 16 and line 20. Vessel 30 comprises three contiguous sections, first adsorption section 34, catalysis section 38, and second adsorption section 42. The physical separation of the three sections of treatment vessel 30 is effected by means well known in the art. For example, catalysis section 38 may be separated from adsorption sections 34 and 42 by a stainless steel screen.

First adsorption section 34 contains at least one layer of an adsorbent material which is capable of adsorbing all of the water and other catalyst poisoning impurities contained in the gas stream. Suitable adsorbents include activated alumina, silica gel, zeolites and combinations thereof. Preferably, adsorption section 34 comprises a predominant layer of activated alumina or silica gel and a layer of zeolite, for example, zeolite 13X or 5A. The water and other catalyst poisons are removed from the gas stream to prevent deactivation of the oxidation catalyst contained in catalysis section 38. When the process is carried out at low temperatures it is particularly important to prevent moisture from contacting the catalyst bed since in doing so it tends to deposit on the catalyst, thereby forming a barrier over the catalyst and preventing the oxygen and hydrogen reactants from contacting the catalyst.

The gas stream next passes through catalysis section 38 of treatment vessel 30. Catalysis section 38 contains catalysts for the conversion of hydrogen and oxygen to water. The catalysts used in the invention may be any element or compound or mixture of elements or compounds that will catalyze the reaction of hydrogen and oxygen to form water. Preferred oxidation catalysts are catalysts containing noble metals, such as platinum, palladium, rhodium or mixtures of these, either alone or in combination with other metals. The catalyst is preferably mounted on an inert support, such as alumina.

The gas leaving catalysis section 38 enters second adsorption section 42 for the removal of the water vapor generated in section 38. Adsorbents used in the second adsorption section 42 can be the same as the adsorbents used in adsorption section 34, namely activated alumina, silica gel, zeolites or combinations thereof.

The purified gas, which now generally contains no more than about one ppm oxygen and no more than about one ppm moisture, is discharged from treatment vessel 30 through line 46 and valve 58 to line 62 where it is sent to storage or to further processing, such as cryogenic distillation.

At the same time that treatment zone 29 is purifying the gas feed, treatment zone 31 is undergoing regeneration to desorb accumulated gaseous impurities. Treatment vessel 32 is essentially the same as treatment vessel 30 and contains a corresponding first adsorption section 36, a catalysis section 40 and a second adsorption section 44. The structure of sections 36, 40 and 44 and the materials contained therein are the same as described above for sections 34, 38 and 42, respectively.

After purifying the feed gas for a period of time, each of the first and second adsorption sections 36 and 44 become contaminated with water and other impurities. Catalysis section 40 may coincidentally accumulate small amounts of moisture and also hydrogen. The gaseous impurities are removed from the beds by purging vessel 32 with a gas which does not adversely affect the catalyst and is free of oxygen and the impurities that are to be removed from vessel 32. When ultra high purity argon is being produced by the process of the invention the vessels being regenerated can be initially purged with nitrogen and subsequently purged with purified argon to minimize loss of purified argon product. A suitable purge gas is the purified product gas. Nongaseous impurities, such as phosphorus and molybdenum compounds are retained on the first adsorbent bed. These can be permitted to accumulate on this bed for a considerable period of time before it is necessary to replace the bed.

Prior to introduction of the purge gas, vessel 32 is vented to reduce the pressure therein to close to atmospheric pressure. This is carried out by opening valve 26 thereby venting the vessel through lines 22 and 28. Referring further to FIG. 1, a purge gas obtained from an independent source (not shown), such as a side stream from line 62 or another stream free of impurities, is introduced into the system via line 70, preferably at a pressure of about 1-5 psig. Optional blower 68 may be included in the purge gas supply line 66 to raise the pressure of the purge gas, if desired.

The temperature of the purge gas entering the system through line 70 is generally close to that of the feed gas. Therefore, in the temperature swing embodiment the purge gas is heated in heater 64, preferably to a temperature of from about 80° to 250° C. The heated regeneration gas then passes through line 54, valve 52 line 48 and into vessel 32. After purging vessel 32 the purge gas exits the system through valve 26 and line 28, thereby removing previously adsorbed impurities from the system.

The heat supplied to vessel 32 by the purge gas need only be sufficient to desorb the impurities contained therein. Accordingly, it is preferable to turn off heater 64 after sufficient heat has been introduced into vessel 32 to satisfactorily purge this vessel. The amount of heat required for a given vessel can be routinely determined. Purge gas is permitted to continue flowing through vessel 32 after heater 64 has been turned off to cool vessel 32 in preparation for the next purification step. After vessel 32 is cooled sufficiently, it is slowly repressurized by passing feed gas through open valve 18 and line 22 and into vessel 32. Vessel 30 continues to purify feed gas during this period. After repressurization of vessel 32, feed gas is purified in this vessel, while vessel 30 undergoes the steps of venting, heating with purge gas and cooling with purge gas, as described above, for vessel 32. The process can run continuously in this manner.

Figure 2:
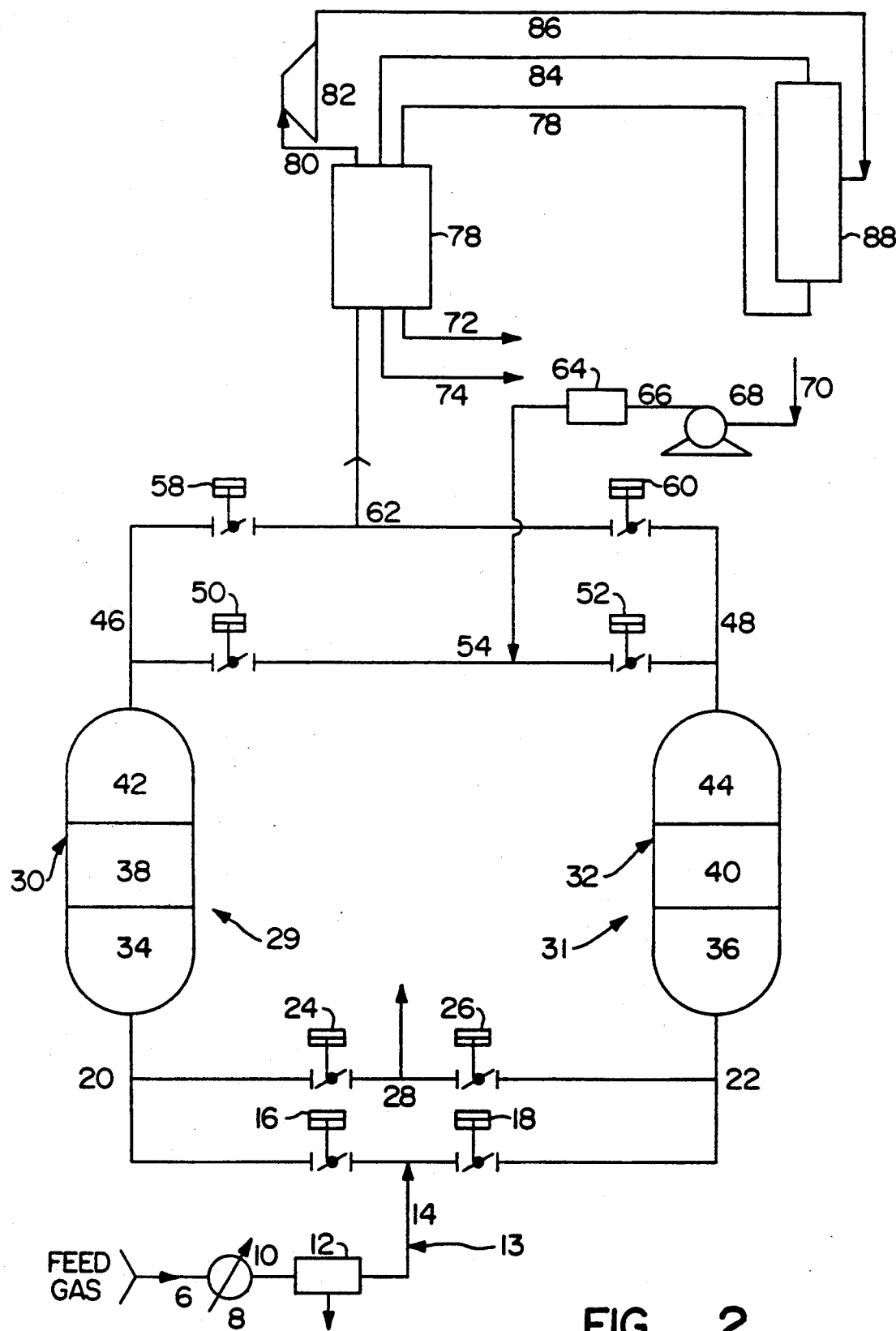
FIG. 2 is a schematic view of a variation of the embodiment shown in FIG. 1, showing subsequent treatment of the highly purified gaseous product in a cryogenic distillation system.

The complete cycle time for the temperature-swing embodiment described in FIG. 2 normally is from about 8 to 24 hours. A complete cycle for a two-bed process operated in the temperature-swing embodiment is given in TABLE I below.

TABLE I

| Step | | Valves Open | Typical Time (hours) |
|---|---|---|---|
| a. | Pressurize vessel 30 with feed, purify using vessel 32 | 16, 18, 60 | 0.25 |
| b. | Purify using vessel 30, vent vessel 32 to atmosphere | 16, 26, 58 | 0.25 |
| c. | Purify using vessel 30, regenerate vessel 32 with hot purge gas | 16, 26, 52, 58 | 2.5 |
| d. | Purify using vessel 30, cool vessel 32 with purge gas | 16, 26, 52, 58 | 5.0 |
| e. | Purify using vessel 30, pressurize vessel 32 with feed | 16, 18, 58 | 0.25 |
| f. | Purify using vessel 32, vent vessel 30 to atmosphere | 18, 24, 60 | 0.25 |
| g. | Purify using vessel 32, regenerate vessel 30 with hot purge gas | 18, 24, 50, 60 | 2.5 |
| h. | Purify using vessel 32, cool vessel 30 with purge gas | 18, 24, 50, 60 | 5.0 |
| | | Total Time | 8.0 |

As previously described, the purge gas used should be free of the impurities to be removed by the system (i.e. oxygen and moisture), and should contain no component that will adversely affect the materials in the three sections of the treatment vessels.

Operation of the process in the pressure-swing embodiment, wherein purge gas is nearly at the same temperature as the feed gas, is similar to the operation of the system according to the temperature-swing embodiment. The temperature of the feed gas entering the treatment zones 29 and 31 through line 14 is generally in the range of about 5° C. to about 70° C. and is preferably in the range of about 10° C. to about 50° C. The purge gas enters the system at line 70 and, if necessary, its pressure is raised using optional blower 68. Heater 64 is not required in the pressure-swing mode of operation. Assuming vessel 32 is undergoing regeneration, purge gas enters vessel 32 via line 54, open valve 52 and line 48, and exits vessel 32 via open valve 26 and line 28. The regeneration procedure for vessel 30 is identical to that for vessel 32.

The time for completing a cycle in the pressure-swing embodiment of the invention is typically from about 6 to 40 minutes. The cycle for the two-vessel process described in FIG. 1 is shown in TABLE II.

TABLE II

| Step | | Valves Open | Typical Time (sec) |
|---|---|---|---|
| a. | Pressurize vessel 30 with feed, purify using vessel 32 | 16, 18, 60 | 60 |
| b. | Purify using vessel 30, vent vessel 32 to atmosphere | 16, 26, 58 | 30 |
| c. | Purify using vessel 30, purge vessel 32 with vessel 30 product | 16, 26, 52, 58 | 510 |
| d. | Pressurize vessel 32, with feed, purify using vessel 30 | 16, 18, 58 | 60 |
| e. | Purify using vessel 32, vent vessel 30 to atmosphere | 18, 24, 60 | 30 |
| f. | Purify using vessel 32, purge vessel 30 with vessel 32 product | 18, 24, 50, 60 | 510 |

TABLE II-continued

| Step | Valves Open | Typical Time (sec) |
|---|---|---|
| | Total Time: | 20 minutes. |

A system for transferring the purified gas to a cryogenic distillation system is shown in FIG. 2. The purified gas stream exiting the system at line 62 is cooled in exchanger 76 against the returning product streams in lines 78 and 86 and the purge gas stream in line 80. The warmed product streams in lines 72 and 74 are the products from the cryogenic separation. The cold feed gas stream in line 80 exiting exchanger 76 is further cooled in turboexpander 82 to produce a stream which is introduced into cryogenic distillation column 88 through line 86. Product streams leave column 88 through lines 78 and 84. In the case of argon purification, the purified gas entering the cryogenic section through line 62 contains nitrogen and hydrogen as impurities. These impurities, together with some argon, are removed from the system through line 74. The bottom product, obtained as pure argon, leaves the system through line 72. Modified cryogenic distillation systems are within the scope of the invention.

Figure 3:
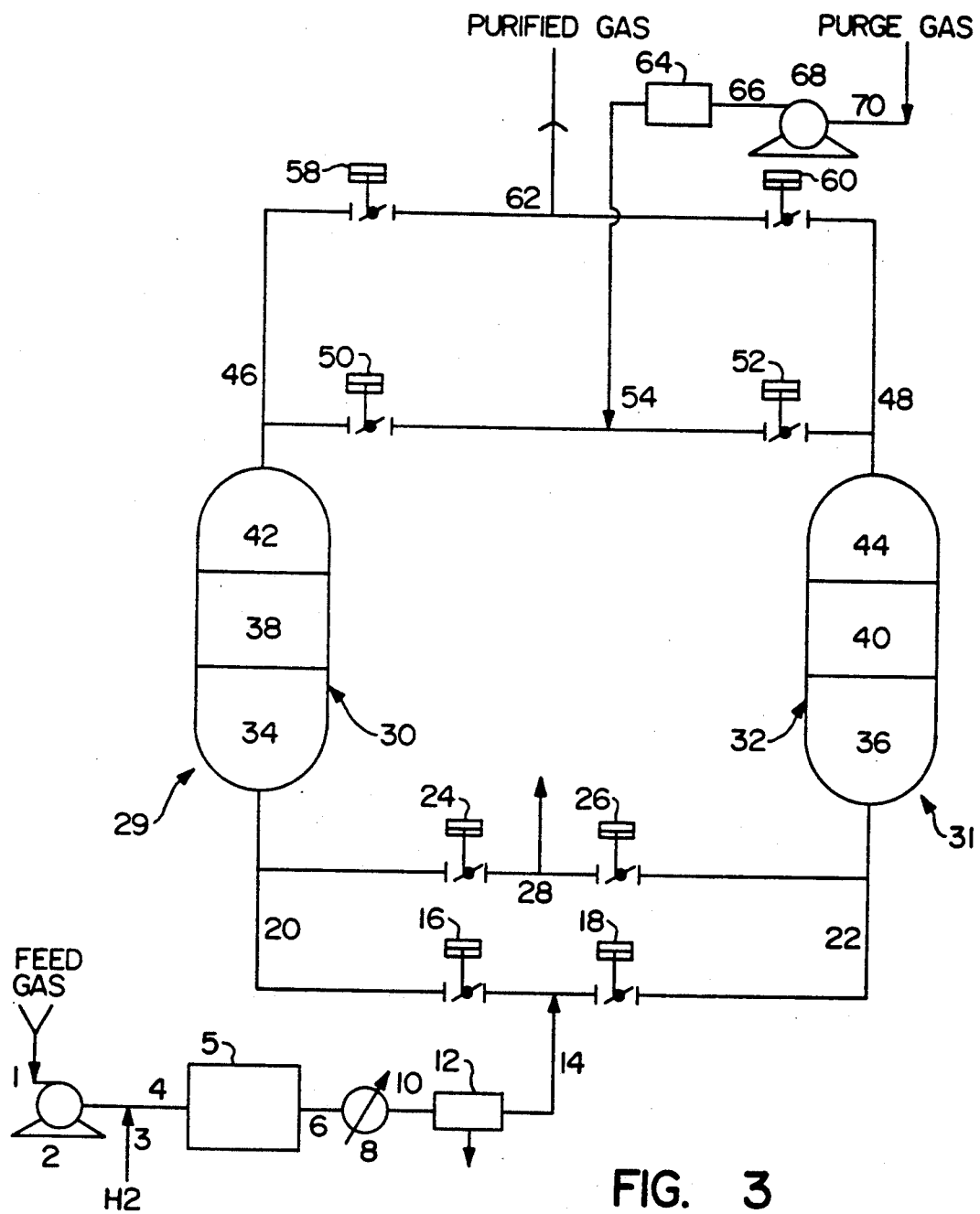
FIG. 3 is a schematic view showing another variation of the embodiment illustrated in FIG. 1.

FIG. 3 illustrates another preferred embodiment of the process of the invention. In the embodiment shown in FIG. 3, an inert gas, or an inert gas mixture containing 0.5-3.0 oxygen is compressed in compressor 2, is mixed with a stoichiometric excess of hydrogen, and is introduced into the system through line 4. Hydrogen and oxygen react to form water in reactor 5, which contains a suitable oxidation catalyst such as a noble metal on an inert support. A gas mixture comprising inert gas, unreacted oxygen and hydrogen, and the water formed in the reaction exits reactor 5 at line 6, and is cooled in aftercooler 8 to remove excess water. Entrained liquid water is removed from the gas stream in separator 12. The operation of the process of FIG. 3 downstream of separator 12 is the same as the process carried out in the system of FIG. 1.

The invention is further illustrated in the following examples in which, unless otherwise indicated, parts, percentages and ratios are on a volume basis.

EXAMPLE 1

The first adsorption section of a pilot plant scale unit similar to the unit illustrated in FIG. 1 was charged with 20 lbs. of activated alumina, the catalysis section of the unit was charged with 5 lbs. of an oxidation catalyst (0.5% by weight palladium on alumina), and the second adsorption section of the unit was charged with 2 lbs. of activated alumina. The three-section unit was preliminarily regenerated using oxygen-free and moisture-free nitrogen heated to a temperature of about 150° C. at a flow rate of 5.0 standard cubic feet/min. for about 3 hours, following which the unit was cooled to a temperature of about 38° C. After completion of the regeneration phase, a water-saturated nitrogen stream at a temperature of about 38° F. and a pressure of about 70 psia and containing 1.5 volume percent hydrogen and 1.0 vpm oxygen was passed through the unit at a flow rate of 12 standard cubic feet/min. The unit was operated according to the cycle set forth in TABLE III.

TABLE III

| Step | Time (hr.) |
|---|---|
| Vessel Pressurization | 0.1 |

TABLE III-continued

| Step | Time (hr.) |
|---|---|
| Feed purification | 3.0 |
| Vessel venting | 0.1 |
| Heating with impurity-free nitrogen | 1.6 |
| Cooling with impurity-free nitrogen | 1.2 |
| Total | 6.0 |

The run was permitted to continue for several 6 hour cycles. During the purification phase of the cycle, the gas exiting the unit was continuously analyzed for oxygen and moisture content. The above procedure was repeated using water-saturated nitrogen gas streams containing 15.0, 30.0, 60.0 and 90.0 vpm oxygen. The results of these experiments are tabulated in TABLE IV.

TABLE IV

| Run | $O_2$ Conc. in Feed Gas, vpm | $O_2$ Conc. in Product Gas, vpm | $H_2O$ Conc. in Product gas, vpm |
|---|---|---|---|
| 1 | 1.0 | <0.1 | <0.1 |
| 2 | 15.0 | <0.1 | <0.1 |
| 3 | 30.0 | <0.1 | <0.1 |
| 4 | 60.0 | <0.1 | <0.1 |
| 5 | 90.0 | <0.1 | <0.1 |

EXAMPLE 2 (Comparative)

The following example shows the adverse effect of moisture on the oxidation catalyst. The pilot plant unit described in Example 1 was preliminarily regenerated in the manner described in Example 1. A water saturated nitrogen stream having a temperature of 38° C. and a pressure of 70 psia, and containing 1.5 vol. percent hydrogen and 30 vpm oxygen was passed through the unit at a flow rate of 12 standard cubic feet/min. The gas stream was permitted to flow through the unit for several hours. During the first four hours of the purification phase, the oxygen and water concentrations in the product gas stream were less than 0.1 vpm. However, the water and oxygen concentration in the product began to increase after 4 hours of purification, and at the end of 8 hours the oxygen and water concentrations in the product gas stream were greater than 2 vpm and several hundred vpm, respectively.

The above examples illustrated the benefits of the invention. In Example 1, in which the catalyst bed was maintained substantially anhydrous by continuously removing moisture from the gas stream prior to its entry into the catalysis section, a product gas containing less than 0.1 vpm oxygen and less than 0.1 vpm water was continuously produced. On the other hand, in the process of Example 2, in which the catalyst bed was not maintained anhydrous, the effectiveness of the catalyst bed gradually deteriorated.

Although the invention has been described with particular reference to a specific example, it is to be understood that the invention is not limited thereto, and that variations are contemplated. For instance, oxidation catalysts other than noble metal catalysts can be used and adsorbents other than alumina can be used in the process of the invention. The scope of the invention is limited only by the breadth of the appended claims.

We claim:

1. A process for the removal of oxygen from a gas stream containing water vapor and up to about 3 vol % oxygen comprising:

a) introducing hydrogen into the gas stream to the extent necessary to ensure that the gas stream contains at least sufficient hydrogen to enable all of the oxygen in the gas stream to be converted to water;

b) contacting the gas stream with an oxidation catalyst in a first catalysis zone, thereby combining a substantial amount of the oxygen in the stream with hydrogen to form water, and producing a gaseous effluent containing not greater than about 500 vpm oxygen;

c) cooling the gaseous effluent from said first catalysis zone;

d) contacting the cooled gaseous effluent with an solid adsorbent in a first adsorption zone, thereby removing substantially all of the water and any oxidation catalyst poisons contained in the cooled gaseous effluent;

e) contacting the substantially anhydrous effluent from said first adsorption zone with an oxidation catalyst in a second catalysis zone, thereby combining substantially all of the oxygen in said substantially anhydrous effluent with hydrogen to produce water; and f) contacting the gaseous effluent from said second catalysis zone with an adsorbent in a second adsorption zone, thereby producing a gaseous stream containing not more than about 1 vpm of oxygen, and not more than about 1 vpm water.

2. The process of claim 1, wherein said gas stream initially contains hydrogen.

3. The process of claim 2, wherein the hydrogen initially present in said gas stream is sufficient to enable substantially all of the oxygen in the feed gas stream to be converted to water.

4. The process of claim 1, wherein said gas stream is initially substantially free of hydrogen.

5. The process of claim 1, wherein the gas stream is comprised predominantly of inert gas.

6. The process of claim 5, wherein said inert gas is selected from argon, nitrogen and mixtures of these.

7. The process of claim 6, wherein said inert gas is argon.

8. The process of claim 6, wherein said inert gas is a mixture of argon and nitrogen.

9. The process of claim 7 or claim 8, wherein the gaseous effluent from said second adsorption zone is cryogenically distilled to recover a substantially pure argon stream.

10. The process of claim 1 further comprising as step (g) regenerating said adsorption zones by passing a substantially oxygen-free and moisture-free gas stream therethrough, thereby removing water therefrom.

11. The process of claim 10, wherein steps (d) to (g) are conducted in a plurality of treatment zones, at least one of said treatment zones being used to remove said oxygen and water from said feed gas and at least one of said treatment zones being simultaneously regenerated to remove water contained therein.

12. The process of claim 1, wherein the oxidation catalyst in said second catalysis zone is a platinum group metal on an inert support.

13. The process of claim 1, wherein the adsorbents in said first and second adsorption zones are independently selected from activated alumina, silica gel, zeolites or mixtures thereof.

14. A process for the removal of oxygen from a crude argon stream containing water vapor and about 0.5 to about 3 vol % oxygen comprising:

(a) introducing hydrogen into the crude argon stream to the extent necessary to ensure that said crude argon stream contains sufficient hydrogen to enable substantially all of the oxygen in the crude argon stream to be converted to water; p1 (b) contacting the rude argon stream with a supported noble metal oxidation catalyst in a first catalysis zone, thereby producing a gaseous effluent containing not more than about 500 vpm oxygen;

(c) cooling the gaseous effluent from said first catalysis zone to a temperature in the range of about 5° to 70° C.;

(d) contacting the cooled gaseous effluent with an adsorbent selected from alumina, silica gel, zeolites and mixtures thereof in a first adsorption zone, thereby removing substantially all of the water and any oxidation catalyst poisons contained in the crude argon stream;

(e) contacting the substantially anhydrous effluent from said first adsorption zone with a supported noble metal oxidation catalyst in a second catalysis zone, thereby combining substantially all of the oxygen in aid substantially anhydrous effluent with hydrogen to produce water; and (f) contacting the gaseous effluent from said second catalysis zone with an adsorbent selected from alumina, silica gel, zeolites and mixtures thereof in a second adsorption zone, thereby producing an argon product stream containing not more than about 1 vpm of oxygen, and not more than about 1 vpm water.

15. The process of claim 14, wherein the argon product stream is fractionally distilled to recover substantially pure argon.

16. The process of claim 15, wherein the supported noble metal catalyst in said first catalysis zone is palladium supported on an alumina substrate.

17. The process of claim 15, wherein the catalyst in said first catalysis zone is platinum or a mixture of platinum and palladium supported on an alumina substrate.

18. The process of claim 1 or claim 14 wherein said first adsorption zone, said second catalysis zone and said second adsorption zone comprise contiguous sections of a single vessel.

* * * * *

UNITED STATES PATENT AND TRADEMARK OFFICE
CERTIFICATE OF CORRECTION

PATENT NO. : 5,204,075

DATED : April 20, 1993

INVENTOR(S) : Jain et al

It is certified that error appears in the above-identified patent and that said Letters Patent is hereby corrected as shown below:

Column 4, line 24, delete "particularly suitable for".

Column 6, line 42, delete "the". (first occurrence)

Column 7, line 63, delete the comma after 32.

Column 8, line 60, delete "F" after 38 and substitute "C" therefor.

Column 10, line 11, delete "an" and substitute "a" therefor.

Column 11, line 5, delete "pl" and begin new paragraph idention therefor.

Column 11, line 6, elete "rude" and substitute "crude" therefor.

Signed and Sealed this

Seventh Day of December, 1993

*Attest:*

BRUCE LEHMAN

*Attesting Officer*       *Commissioner of Patents and Trademarks*